Dec. 4, 1945.   S. W. THOMPSON   2,390,229
TRANSMISSION GEARING FOR CRANKSHAFTS
Filed Feb. 24, 1944   4 Sheets-Sheet 1
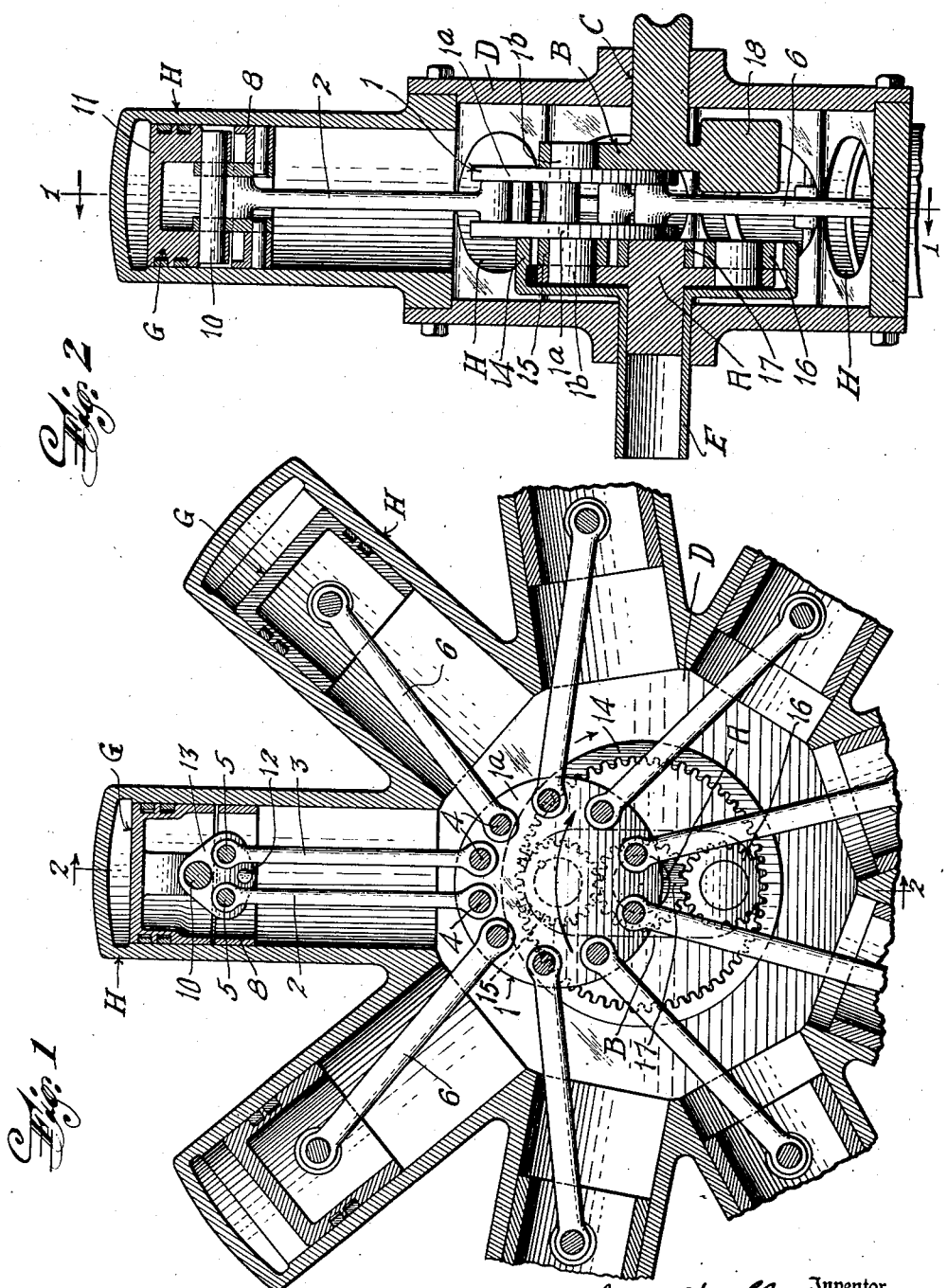

Dec. 4, 1945.                S. W. THOMPSON                 2,390,229
                    TRANSMISSION GEARING FOR CRANKSHAFTS
                    Filed Feb. 24, 1944            4 Sheets-Sheet 2
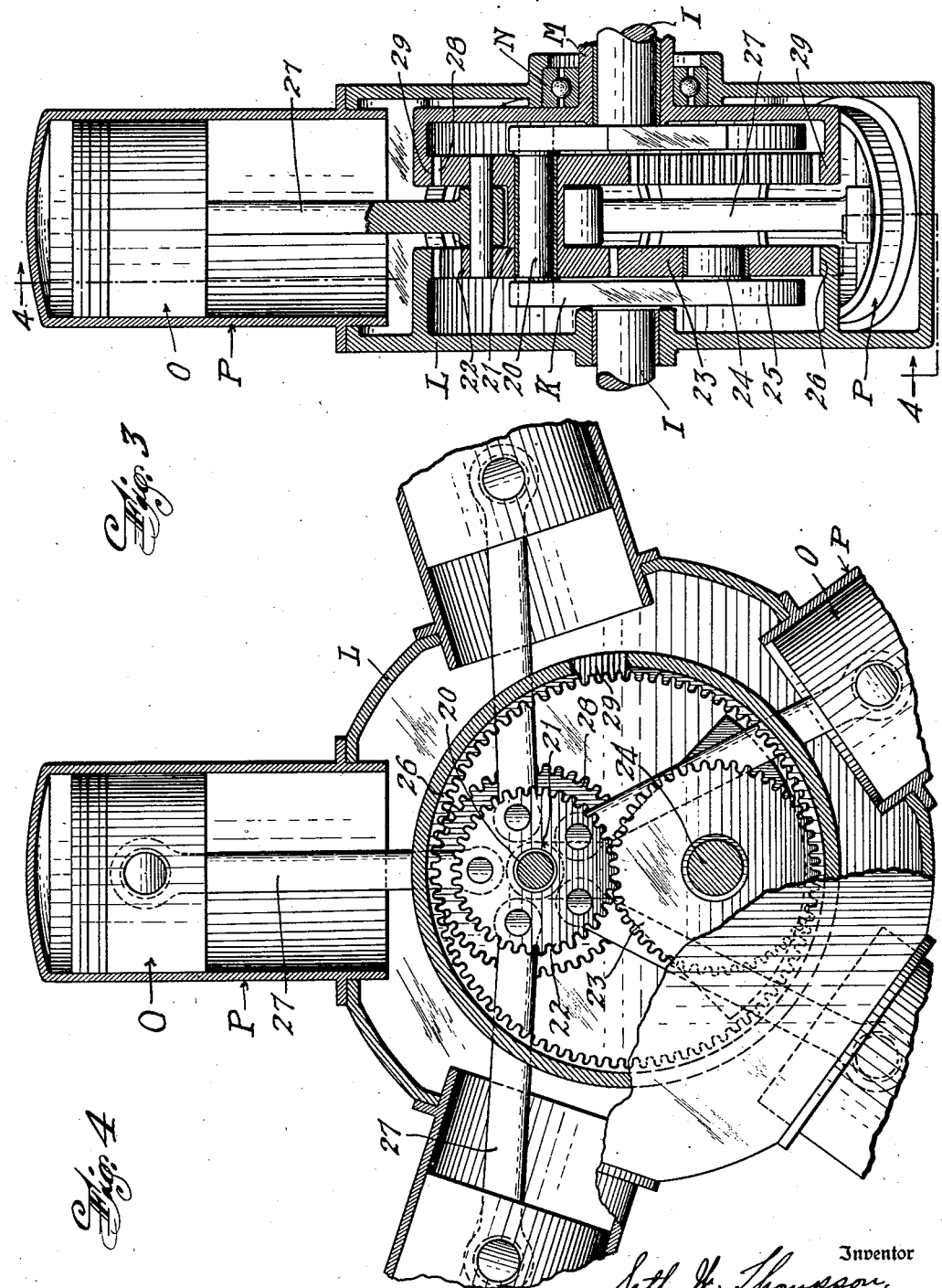
Inventor
Seth W. Thompson,
By
Harry R. Cook.
Attorney

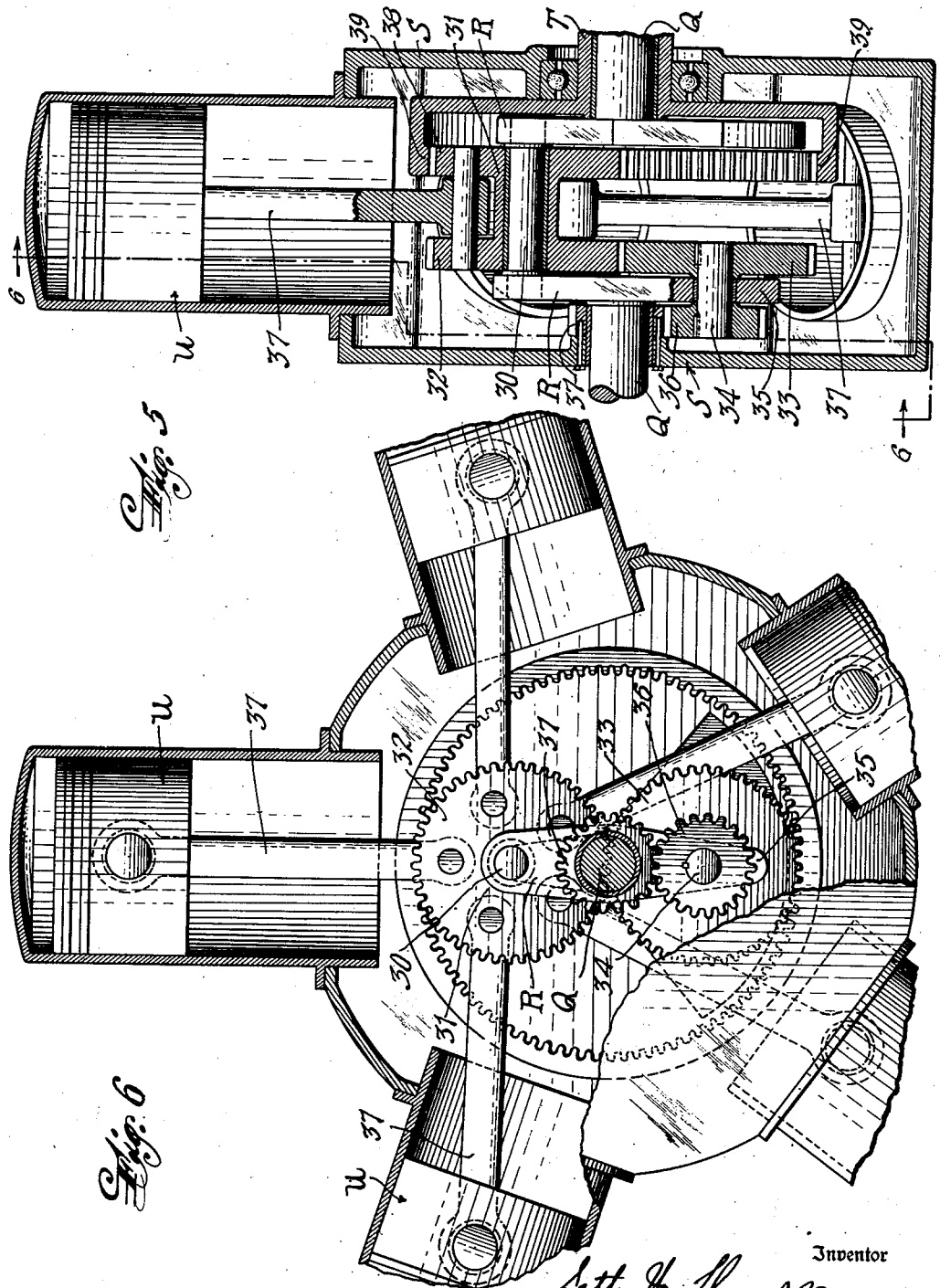

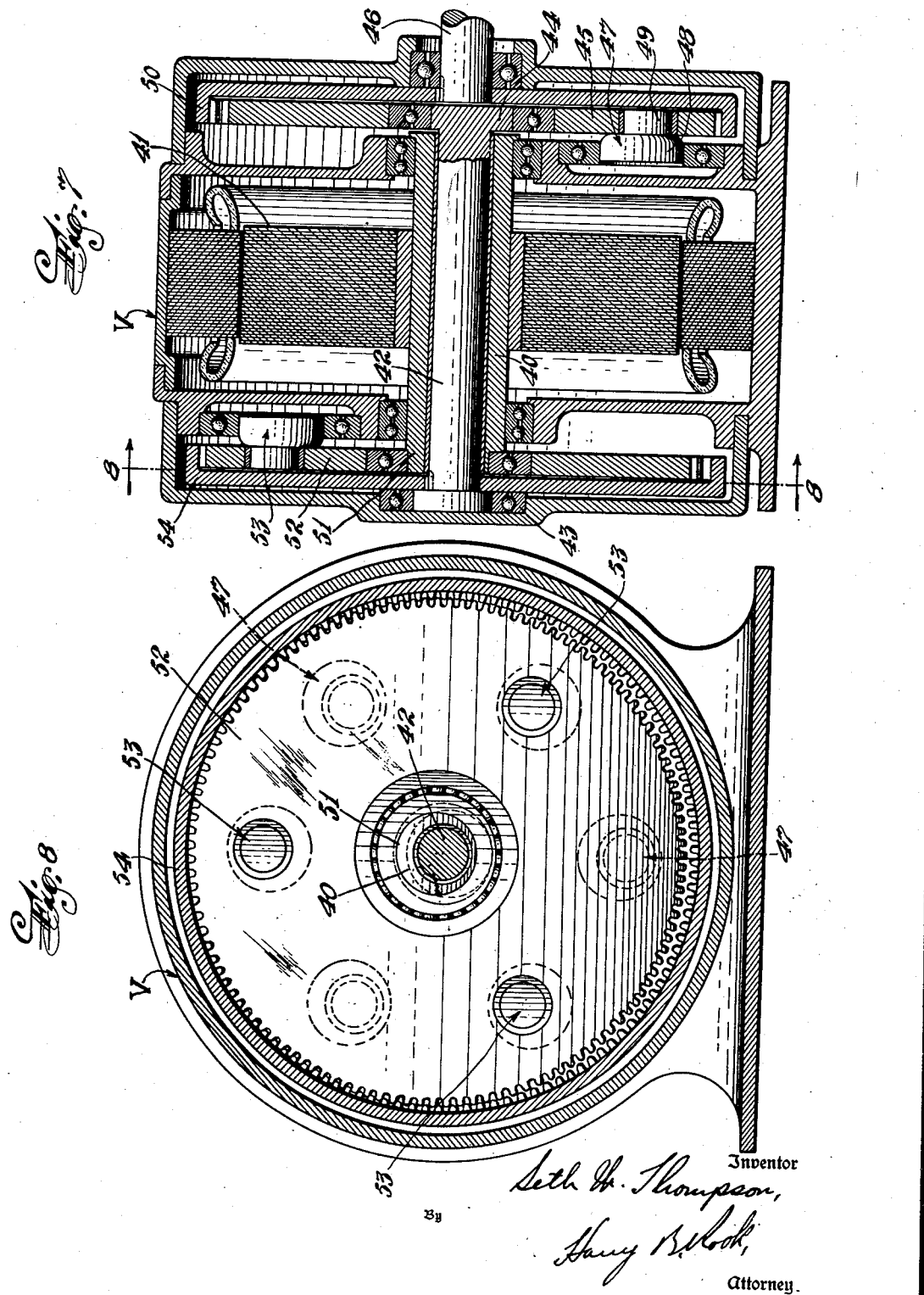

Patented Dec. 4, 1945

2,390,229

UNITED STATES PATENT OFFICE 2,390,229

TRANSMISSION GEARING FOR CRANKSHAFTS

Seth W. Thompson, Essex Fells, N. J.

Application February 24, 1944, Serial No. 523,685

11 Claims. (Cl. 74—52)

This application is a continuation in part of my copending application Serial No. 451,470, filed July 18, 1942.

In certain types of engines, particularly aeronautical engines, speed reducing gearing is utilized between the crank shaft of the engine and driven or propeller shaft, and various means have been provided for connecting the engine pistons to the crank shaft. In radial engines, that is, engines of the type that include a plurality of cylinders arranged radially about a crank shaft and in which are reciprocable pistons, one known construction comprises a bearing ring rotatably mounted on the crank of the shaft, and a connecting rod rigidly and generally integrally connected to and radially projecting from said ring and pivotally connected to one piston, there being a connecting rod for each of the other pistons having one end pivotally connected to said bearing ring and the other end pivotally connected to the corresponding piston. The rod that is rigidly connected to the bearing ring is called the "master-rod," and its rigid connection to the bearing ring is for the purpose of preventing rotation of the ring about its axis on the crank.

Known structures of this general character have not been entirely satisfactory. The "master-rod" necessarily is large and heavy, and the differences or non-uniformity in the manner of connecting the "master-rod" and the other connecting rods to the crank, cause the points of pivotal connection of the connecting rods to said bearing ring to move in elliptical paths while the crank moves in a circular path. This in turn causes non-uniform distribution of the strains imposed by the pistons on the crank and also results in vibration of the parts and complications in timing of the valves and the ignition.

One structure for overcoming this objection in general comprises a bearing ring mounted on the crank for relative rotation of the crank and ring, and two connecting rods each having its ends pivotally connected respectively to said bearing ring and to one piston on axes parallel to the axis of said shaft so that each pivotal connection is located at an angle of an imaginary parallelogram two of whose sides are imaginary straight lines each passing through said pivotal connections of one connecting rod, while the other two sides are imaginary straight lines passing through the pivotal connections of said rods to said piston and through the pivotal connections of said rods to said bearing ring, respectively. With such a construction rotation of the bearing ring about its axis on the crank is prevented without the use of the heavy, complicated "master-rod," and each pivotal connection of a piston rod with said bearing ring moves in a true circle as the crank shaft revolves, thereby ensuring even distribution of forces exerted on the crank by the pistons, and consequent minimum vibration of the parts.

One object of my present invention is to provide in an engine of the general character described a novel and improved construction and combination of means for connecting the engine pistons to the crank shaft, and speed-reducing means for connecting the crank shaft to a driven shaft, such as a propeller shaft, which shall comprise a minimum number of simple, relatively inexpensive parts and which shall be reliable in operation.

Another object is to provide such a construction and combination of parts devoid of the usual "master-rod" and which shall include a bearing member on the crank of the crank shaft for relative rotation of the crank and said member about an axis parallel to that of the shaft, operative connections between said bearing member and the engine pistons including means for preventing rotative motion of said bearing member about its axis on the crank and which shall ensure bodily rotation of said member in a true circular path, and means for connecting said bearing member to said driven shaft so that the latter shall be driven at a speed different from that of the crank shaft.

A further object is to provide novel and improved mechanism for effecting a speed-changing curvilinear translation of motion between a reciprocable member, e. g. a piston or connecting rod, and a rotatable member, e. g. a gear or shaft, which shall be simple, compact and strong and for example can be located within a crank case of the size and general type usually found in airplane engines.

Other objects are to provide a novel and improved speed reducing mechanism embodying the principles above described which can be utilized with electric motors and shall be compact, simple and smooth running; and to obtain other advantages and results of the invention which will be brought out by the following description in conjunction with the accompanying drawings in which Figure 1 is a fragmentary, schematic, vertical, sectional view on the line 1—1 of Figure 2 through an internal combustion engine of the radial type embodying a connection between one of the pistons and the crank shaft and a connection between the crank shaft and the driven shaft, in accordance with the invention.

Figure 2 is an enlarged transverse, vertical, sectional view on the line 2—2 of Figure 1.

Figure 3 is a view similar to Figure 2 showing a modification of the invention.

Figure 4 is a transverse, vertical sectional view on the line 4—4 of Figure 3.

Figure 5 is a view like Figure 2 illustrating another form of the invention.

Figure 6 is a view similar to Figure 4 taken on the line 6—6 of Figure 5.

Figure 7 is a vertical longitudinal sectional view showing the invention embodied in a speed-reducing gearing for electric motors, and Figure 8 is a transverse vertical sectional view on line 8—8 of Figure 7.

While the invention may be used with different types of internal combustion engines, I have shown it in conjunction with an engine of the aeronautical type which includes a crank shank and a plurality of cylinders arranged radially relative to the crank shaft and disposed in a common plane. For simplicity in illustration, some of the cylinders have been omitted.

In the drawings, the engine is shown as including a crank shaft A which is shown as comprising two sections each having a crank arm B which is connected to the other crank arm by a special crank pin or bearing member 1 to form a double crank. One end of the shaft is journaled in a bearing C in the crank case D. The other end of the crank shaft is journaled in a tubular shaft E, for example a propeller shaft of an aeroplane, which is in turn journaled in a bearing F in the crankcase. The crank B is connected to pistons C, one of which is reciprocable in each of the cylinders H that are connected to the crankcase in radial relation to the crank shaft.

The bearing member is shown as comprising two sections 1a each including a circular disk having a central stud 1b journaled in a bearing 1c in the corresponding crank arm for relative rotation of the crank and bearing member on an axis parallel to that of the crank shaft, said disks being connected by pins 4 by which the pistons G are connected to the crank shaft. At least one piston G is connected to the bearing member by two connecting rods 2 and 3 each of which has its ends pivotally connected at 4 and 5, respectively, to the bearing member and to the corresponding piston. The pivotal connections 4 and 5 are so arranged that each is located at the angle of an imaginary parallelogram two of whose sides are imaginary straight lines each passing through said pivotal connections of one connecting rod, while the other two sides are imaginary straight lines passing through the pivotal connections of said rods to the pistons and through the pivotal connections of said rods to said bearing ring, respectively. As shown, only one piston is connected to the bearing ring by the two connecting rods, the other pistons being connected to the bearing ring by single connecting rods 6 in the usual manner.

More specifically describing the connections of the rods 2 and 3 to the piston, the piston includes a main section 7 and a secondary section 8 which are movable relatively to each other. The main section carries the usual piston rings 9 and the usual wrist pin 10 whose axis is parallel to the axis of the crank shaft A. The secondary section 8 comprises a narrow ring of the same diameter as and coaxial with the head 11 of the main section 7 and has mounted therein a pair of diametrically aligned pivot pins 12 to which are pivotally connected links 13 that are also pivoted on the wrist pin 10.

The two links 13 are spaced apart within the piston and are rigidly connected by spaced and parallel coupling pins which constitute the pivotal connections 5 whose axes are parallel to the axes of the crank shaft and the wrist pin, and equi-distantly spaced at opposite sides of the axis of the wrist pin.

With this construction, the two sections 7 and 8 of the piston may tilt relatively to each other in that axial plane of the piston which is perpendicular to the axis of the crank shaft, the two sections of the piston being pivotally connected by the links 13, wrist pin 10 and pivot pins 12. The two connecting rods 2 and 3 are pivotally connected directly to the links 13 and indirectly to both sections of the piston through said links, the pivot pins 12 and wrist pin 10. With this arrangement the bearing member 1 will be against all rotative motion about its axis.

Accordingly, in the operation of the structure so far described, the pivotal connection of each of the rods 2, 3 and 6 to the bearing member 1 will rotate in a circular path during rotation of the crank shaft under the power produced by the explosions in the cylinders; and the two sections of the piston to which the rods 2 and 3 are connected may tilt relatively to each other and to the rods so as to allow the piston to adjust itself in the cylinder and prevent undesirable friction between the piston and the cylinder during reciprocation of the piston. There will be a uniform distribution of forces applied to the crank shaft by the pistons, and consequently, a minimum of vibration of the pistons and connecting rods.

This construction and operation is especially adaptable to combination with a speed-reducing connection between the crank shaft and the driven or propeller shaft E. As shown in the drawings, the propeller shaft has an internal ring gear 14 rigidly mounted thereon and rotatable coaxially therewith, and one end of the bearing member 1 has a pinion 15 rigidly connected thereto, rotatable coaxially therewith and meshing with the internal ring gear 14.

While it is not necessary, it may be desirable to mount a second pinion 16 on the crank shaft to rotate on an axis parallel to the axis of the shaft, and to mount an idler pinion 17 on a stud on the crank shaft so that said idler pinion meshes with both the pinions 15 and 16.

With this construction, as the crank shaft is rotated by the force of explosions in the cylinders H, the propeller shaft E will be driven by the pinion 15 which meshes with the ring gear 14. The ring gear 14 will also be driven by the pinion 16 through the idler 17. The speed of rotation of the ring gear and propeller shaft will be less than that of the crank shaft, and by proper relationship of the sizes of the pinions and ring gear, any desired speed-reducing ratio between the crank shaft and the driven shaft may be obtained. If desired, in order to ensure smooth operation of the engine, counter-weights 18 may be mounted on the crank shaft in counter-balancing relation to the crank B as usual.

A modification of the invention is shown in Figures 3 and 4 where the crank shaft I has a double crank K in which is a crankpin 20. One end of the crank shaft is journaled on the crank case L while the other end is journaled in a tubular shaft M, such as the propeller shaft of an airplane, which is in turn journaled in a bearing N in the crank case. The bearing member 21 corresponding to the bearing member 1 is mounted on the crankpin 20 for relative rotation of the crankpin and the bearing member on an axis parallel to that of the crank shaft, and has a gear 22 rigidly connected to one end thereof coaxial therewith which meshes with a gear 23 that is journaled on a stud 24 on one cheek 25 of the crank. The gear 23 in turn meshes with an internal gear or rack 26 which is rigidly connected to the crank case coaxially with the crank shaft.

The bearing member 21 is shown as connected to the pistons that are reciprocable in cylinders P by the respective connecting rods 27 each of which is pivotally connected at one end to the bearing member and at its other end to the corresponding piston.

The bearing member 21 also has another gear 28 rigidly connected thereto and coaxial therewith and meshing with an internal ring gear 29 that corresponds to the internal ring gear 14 and which is mounted on the tubular shaft M to rotate therewith.

With this construction it will be observed that the bearing member 21 will be held against all rotative movement on the crankpin 20 through the gears 22 and 23, the latter of which meshes with the stationary or circular rack 26. At the same time, there is a driving and speed-changing connection between the crankpin 20 and the shaft M through the gear 28 and the internal gear 29.

Another modification of the invention is shown in Figures 5 and 6 wherein the crank shaft Q has a double crank R which carries the crankpin 30, one end of the crank shaft being journaled in the crank case S and the other end being journaled in a tubular shaft T. A bearing member 31 corresponding to the members 1 and 21 is mounted on the crank pin for relative rotation of the crank and bearing member on an axis parallel to that of the crank shaft.

A gear 32 is rigidly connected to the bearing member coaxially therewith and meshes with a gear 33 which is mounted on a stud shaft 34 which in turn is journaled in the crankarm 35 and has mounted thereon a pinion 36 which meshes with a gear 37 which is rigidly connected to the crank case. The gear 33 and pinion 36 are rigidly connected by the stud shaft 34 to rotate together, and with this construction it will be observed that the bearing member will be held against all rotative motion about its axis but will be rotated in a circular path during rotation of the crank shaft.

The bearing member may be connected by connecting rods 37 to the respective pistons U in the same manner in which the bearing member 21 is connected to the pistons O.

The bearing member also has another gear 38 rigidly connected thereto and coaxial therewith and meshing with an internal ring gear 39 which is in turn mounted on the shaft T to rotate therewith, whereby there is a driving and speed-changing connection between the crank R and the shaft T through the bearing member and gears 38 and 39.

Figures 7 and 8 show an embodiment of the invention in a speed-reducing gear for an electric motor or the like. The reference character V designates the motor frame or casing in which is journaled a tubular shaft 40 that extends entirely through the frame and upon which is mounted the armature 41 of the motor which is schematically illustrated. Within the tubular shaft 40 is a secondary shaft 42 which may have one end journaled in a bearing 43 in the frame of the machine. The other end of the shaft 42 has an eccentric 44 on which is journaled a spur gear 45 which is held against all rotative movement relatively to its axis but is bodily moved in a circular path whose center is coaxial with the shaft 40 and the driven shaft 46. The gear 45 is held against rotation about its axis during bodily movement thereof by a plurality of crank-like members or eccentrics 47 each of which has a stud 48 journaled in a bearing in the frame of the motor and another stud 49 which is pivotally connected to the gear. The throws of the crank-like members 47 and the eccentric 44 on the shaft 42 are always equal and parallel so that the gear 45 must rotate in a circular path as above described, but at the same time will be held against rotation about its axis. Consequently every point in the gear 45 will rotate in a circular path about an imaginary center and at the same speed.

The gear 45 meshes with an internal tooth or ring gear 50 which is rigidly connected to the driven shaft 46 to rotate therewith.

It will be seen that the gear 50 corresponds to the gear 14, 29 and 39 above described, and that there is a driving and speed-changing connection between the shaft 42 and the shaft 46.

There is also a similar driving and speed changing connection between the shaft 40 and the shaft 42. This connection includes an eccentric 51 on the end of the shaft 40 on which is journaled a spur gear 52 identical with the gear 45 which in turn is mounted on the frame of the motor by crank-like members or eccentric 53 in the same manner in which the gear 45 is mounted on the crank-like members 47. The gear 52 meshes with an internal ring gear 54 identical with the gear 50 which is mounted on the shaft 42 to rotate therewith.

By varying the relative sizes of the gears 52, 54, 45 and 50, the speed ratio between the driving shaft 40 and the driven shaft 46 may be changed. In the construction shown there is a double reduction of the speed from the motor shaft 40 to the driven shaft 46; for example, it is possible to effect at 24 to 1 reduction through the gears 54 and 52, and obtain a second 24 to 1 reduction through the gears 45 and 50.

As will be understood by those skilled in the art, instead of applying power to the crankshaft as described, the crankshafts could be used as driven shafts by applying power to the shafts E, M, T, etc. Also, external tooth gears might be used instead of internal gears 14, 29, 39, etc., by making the crankshafts tubular and journaling the shafts, E, M, etc., inside the tubular crankshafts. This would of course change the speed ratios.

While I have shown and described several preferred embodiments of my invention, it will be understood that this is primarily for illustrating the principles of the invention, and that many modifications and changes in the details of construction of the invention and embodiment of the invention in other types of machines, will occur to those skilled in the art as within the spirit and scope of the invention.

What I claim is:

1. The combination with a shaft having a crank and a crank pin, a plurality of cylinders radially related to said shaft and pistons reciprocable in said cylinders; of a bearing member mounted on said crank pin for relative rotation of the crank pin and said member about an axis parallel to that of the crank shaft, a connecting rod pivotally connected to each piston and pivotally connected to said bearing member, means for preventing all rotative movement of said member about its axis on said crank so that every point on said member moves in a circular path and at the same speed during bodily movement of said member by said crank, a driven shaft rotatable relatively to said crank shaft and coaxially therewith, a gear on and rotatable with said driven shaft, and a pinion rigidly connected to and coaxial with said bearing member and meshing with said gear.

2. The combination with a shaft having a crank and a crank pin, a plurality of cylinders radially related to said shaft and pistons reciprocable in said cylinders; of a bearing member mounted on said crankpin for relative rotation of the crankpin and said member about an axis parallel to that of said shaft, a connecting rod pivotally connected to each piston and pivotally connected to said bearing member, means for preventing all rotative movement of said bearing member about its axis on said crank so that every point on said member moves in a circular path and at the same speed during bodily movement of said member by said crank, a driven shaft rotatable relatively to said crank shaft and coaxially therewith, an internal ring gear on and rotatable with said driven shaft, and a pinion rigidly connected to said bearing member, coaxial therewith and meshing with said ring gear.

3. The combination set forth in claim 1 with the addition of a second pinion meshing with said gear and mounted on said crank to rotate on an axis parallel to the axis of the shaft, and a third pinion idly rotatable on said crank and meshing with both of the first-mentioned two pinions.

4. The combination of a support, a gear journaled for rotation on said support, a crankshaft journaled in said support coaxially with said gear and having a crank, and a gear connection between said crankshaft and said gear including at least another gear mounted for revolution about an axis on said crank parallel to the axis of said crankshaft and movable bodily by said crank in a circular path whose center is colinear with the axis of the said crankshaft and said first-mentioned gear, and means to hold the last-mentioned gear against rotation about its axis on said crank.

5. The combination of a support, a gear journaled for rotation on said support, a crankshaft journaled on said support coaxially with said gear and having a crank, and a gear connection between said crankshaft and said gear including a plurality of intermeshing gears mounted on said crank for revolution relatively thereto about individual axes parallel to the axis of said crankshaft and movable bodily by said crank so that their axes travel in paths whose centers are colinear with the axis of the first-mentioned gear, at least one of said plurality of gears being journaled on said crankpin, and mechanism for holding at least one of said plurality of gears against rotation about its axis comprising a means pivotally connected to said gear and a linearly slidable member pivotally connected to said means.

6. The combination of a rotatable gear, a second gear meshing with said rotatable gear, means for bodily moving said second gear so that its axis travels in a circular path whose center is colinear with the axis of said rotatable gear, and means other than said rotatable gear for holding said second gear against all rotative movement about its own axis so that every point thereon travels in a circular path.

7. The combination of two shafts, a rotatable gear on one thereof, and a gear connection between said rotatable gear and the other shaft including at least a second gear mounted on said second shaft for bodily movement such that its axis travels in a circular path whose center is colinear with the axis of said rotatable gear upon rotation of said second shaft and means other than said rotatable gear for holding said second gear against all rotative movement relatively to its axis during said bodily movement so that every point on said second gear moves in a circular path.

8. The combination of a support, a gear journaled for rotation on said support, a crankshaft journaled on said support coaxially with said gear and having a crank, and a gear connection between said crankshaft and said gear including a plurality of intermeshing gears mounted on said crank for revolution relatively thereto about individual axes parallel to the axis of said crankshaft and movable bodily by said crank so that their axes travel in paths whose centers are colinear with the axis of the first-mentioned gear, at least one of said plurality of gears being journaled on said crankpin, a fixed gear, and a gear connection between said fixed gear and one of said plurality of intermeshing gears for holding at least one of said plurality of intermeshing gears against all rotative motion relatively to its axis.

9. The combination of a rotatable gear, a second gear meshing with said rotatable gear, means for bodily moving said second gear so that its axis travels in a circular path whose center is colinear with the axis of said rotatable gear, a fixed gear, and a gear connection other than said rotatable gear between said fixed gear and said second gear for holding said second gear against all rotative motion about its own axis so that every point thereon travels in a circular path.

10. The combination of a support, a shaft journaled for rotation therein, an internal gear mounted on said shaft to rotate therewith, a tubular shaft surrounding the first-mentioned shaft and having a crank-like eccentric at one end, a second gear meshing with said internal gear and mounted on said eccentric to permit relative rotation of said gear and said crank-like eccentric about the axis of the latter, and crank-like members connected between said support and said second gear for holding the latter against all rotative movement about said eccentric and to guide said second gear so that every point thereon moves in a circular path upon rotation of said tubular shaft.

11. The combination set forth in claim 10 wherein said first-mentioned shaft has a crank-like eccentric at its other end, and with the addition of a third shaft whose axis is colinear with the axis of the first-mentioned shaft, a third and internal gear on said third shaft, a fourth gear meshing with said third gear and mounted on said crank-like eccentric on said first mentioned shaft to permit relative rotation of said third gear and said eccentric about the axis of said eccentric, and crank-like members connected between said support and said fourth gear for holding the latter against all rotative movement about the axis of said eccentric on said first-mentioned shaft so that every point on said fourth gear will travel in a circular path upon rotation of said tubular shaft.

SETH W. THOMPSON.